United States Patent Office.

OSCAR N. BARTHOLOMEW AND J. S. THURSTON, OF ELMIRA, NEW YORK, ASSIGNEES BY MESNE ASSIGNMENTS OF OSCAR N. BARTHOLOMEW.

*Letters Patent No.* 69,612, *dated October* 8, 1867; *reissue No.* 2,932, *dated May* 19, 1868.

IMPROVED ROOFING-COMPOUND.

The Schedule referred to in these Letters Patent and making part of the same.

TO ALL WHOM IT MAY CONCERN:

Be it known that OSCAR N. BARTHOLOMEW, of Elmira, in the county of Chemung, and State of New York, has invented a new and useful Improvement in Composition for Covering the Roofs of Houses, and which he denominates "Bartholomew's Elastic Metallic Roofing;" and we do hereby declare that the following is a full, clear, and exact description of the mode of compounding and preparing the same.

Take the following ingredients in about the proportions stated, namely, hydrate of lime, two parts; mineral paint, such as oxide of iron, for which fire-clay may be substituted, two parts; marble-dust, two parts, and calcined plaster of Paris, one part, and mix said ingredients thoroughly with coal-tar, or other analogous material suitable for holding them together, so as to make an adhesive paste.

The compound thus prepared is then ready for application to paper, felting, tin, board, shingle, or any other kind of roof. Two coats of this compound should be applied, and the last coat may be covered with sand or any mineral substance to form a hard surface.

The proportions above named may be varied as desired.

What we claim as the invention of said BARTHOLOMEW, and desire to secure by Letters Patent, is—

A composition of matter compounded from the ingredients named, and in the manner substantially as and for the purpose set forth.

In testimony whereof, we have signed our hands to this specification in presence of two subscribing witnesses.

OSCAR N. BARTHOLOMEW,
J. S. THURSTON.

Witnesses:
R. R. SOPER,
C. H. BAKER.